US011055213B2

United States Patent
Gao et al.

(10) Patent No.: US 11,055,213 B2
(45) Date of Patent: Jul. 6, 2021

(54) FACILITATING LOCALIZATION OF CODE DEFECT

(71) Applicant: International Business Machines Corporation, Armonk, NY (US)

(72) Inventors: Lei Gao, Xian (CN); Jin Wang, Xian (CN); Kai Li, Xian (CN); Dong Hai Yu, Xian (CN); Rui Wang, Xian (CN)

(73) Assignee: International Business Machines Corporation, Armonk, NY (US)

( * ) Notice: Subject to any disclaimer, the term of this patent is extended or adjusted under 35 U.S.C. 154(b) by 56 days.

(21) Appl. No.: 16/675,759

(22) Filed: Nov. 6, 2019

(65) Prior Publication Data

US 2021/0133092 A1    May 6, 2021

(51) Int. Cl.
   *G06F 11/36*    (2006.01)
(52) U.S. Cl.
   CPC ...... *G06F 11/3692* (2013.01); *G06F 11/3664* (2013.01); *G06F 11/3688* (2013.01)
(58) Field of Classification Search
   None
   See application file for complete search history.

(56) References Cited

U.S. PATENT DOCUMENTS

| | | | | |
|---|---|---|---|---|
| 7,010,546 | B1 * | 3/2006 | Kolawa | G06F 11/3688 707/694 |
| 9,146,712 | B2 | 9/2015 | Balachandran | |
| 9,547,579 | B1 | 1/2017 | Shen et al. | |
| 10,467,132 | B1 * | 11/2019 | Chatterjee | G06Q 10/0639 |
| 2010/0094878 | A1 * | 4/2010 | Soroca | G06Q 30/02 707/748 |
| 2013/0219057 | A1 | 8/2013 | Li et al. | |

FOREIGN PATENT DOCUMENTS

| | | |
|---|---|---|
| CN | 107391358 A | 11/2017 |
| JP | 2017531855 A | 10/2017 |

OTHER PUBLICATIONS

Liang, "Deep Learning With Customized Abstract Syntax Tree for Bug Localization", 2019, IEEE Access (Year: 2019).*
Soomro, "Fault Localization Models in Debugging", 2017, 2017 International Conference on Infocom Technologies and Unmanned Systems (ICTUS'2017) (Year: 2017).*
Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

* cited by examiner

*Primary Examiner* — Hossain M Morshed
(74) *Attorney, Agent, or Firm* — Nolan M. Lawrence

(57) ABSTRACT

Facilitating localization of code defect of an application includes receiving a set of element-value pairs generated by running the application with a test case. Further differences are identified between the set of element-value pairs and a baseline data result for the test case. Tree maps associated with respective elements are displayed in the set of element-value pairs, each of the tree maps representing relationship of code entities of the application related to its associated element, wherein one or more of the tree maps are marked out to show the differences thereby identifying potential defective codes of the application that have caused the differences.

20 Claims, 9 Drawing Sheets

```
<?xml version="1.0"?>
<XML version="1.0">
  <Statistic name="Element_1" value="2.3"/>
  <Statistic name="Element_2" value="274.9"/>
</XML>
```

TestResult.xml — 811

```xml
<?xml version="1.0" encoding="UTF-8"?>
<XML version="1.0">
<Statistic name="Element_1" value="31345.94"/>
<Statistic name="Element_2" value="78423.12"/>
<Statistic name="Element_3" value="0.81"/>
<Statistic name="Element_4" value="652.42"/>
<Statistic name="Element_5" value="36294.26"/>
...
<Statistic name="Element_i" value="0.91"/>
<Statistic name="Element_j" value="1341.21"/>
<Statistic name="Element_k" value="-10221.52"/>
...
<Statistic name="Element_n" value="213.91"/>
</XML>
```

Baseline.xml — 821

```xml
<?xml version="1.0" encoding="UTF-8"?>
<XML version="1.0">
<Statistic name="Element_1" value="26598.25"/>
<Statistic name="Element_2" value="32556.03"/>
<Statistic name="Element_3" value="0.81"/>
<Statistic name="Element_4" value="383.98"/>
<Statistic name="Element_5" value="36294.26"/>
...
<Statistic name="Element_i" value="1.55"/>
<Statistic name="Element_j" value="3255.89"/>
<Statistic name="Element_k" value="-10221.52"/>
...
<Statistic name="Element_n" value="497.03"/>
</XML>
```

*FIG. 8*

FACILITATING LOCALIZATION OF CODE DEFECT

BACKGROUND

The present disclosure relates to testing of applications and, particularly, to facilitating localization of code defects.

Testing is a phase in the development of applications. Upon completion of code of an application, test cases and associated baseline results are prepared. Then the application is executed with a test case to output a result. The output result is compared with the baseline result for the test case. If there are differences between the output result and the baseline result, engineers need to check the differences to figure out the position of potential defective code in the source code so as to fix any code defect. The process is repeated for each of the test cases before the application may be released. Locating code defect is time-consuming. It is desirable to provide efficient tools that facilitate users to localize code defect.

SUMMARY

According to one embodiment of the present disclosure, there is provided a computer-implemented method for facilitating localization of code defect of an application. The method comprises receiving a set of element-value pairs generated by running the application with a test case. The method further comprises identifying differences between the set of element-value pairs and a baseline data result for the test case. The method further comprises displaying tree maps associated with respective elements in the set of element-value pairs, each of the tree maps representing relationship of code entities of the application related to its associated element, wherein one or more of the tree maps are marked out to show the differences thereby localizing potential defective codes of the application that have caused the differences.

According to another embodiment of the present disclosure, there is provided a system for facilitating localization of code defect of an application. The system comprises one or more processors and a computer-readable memory coupled to the one or more processors. The computer-readable memory comprises instructions for receiving a set of element-value pairs generated by running the application with a test case. The computer-readable memory further comprises instructions for identifying differences between the set of element-value pairs and a baseline data result for the test case. The computer-readable memory further comprises instructions for displaying tree maps associated with respective elements in the set of element-value pairs, each of the tree maps representing relationship of code entities of the application related to its associated element, wherein one or more of the tree maps are marked out to show the differences thereby localizing potential defective codes of the application that have caused the differences.

According to still another embodiment of the present disclosure, there is provided a computer program product for facilitating localization of code defect of an application, comprising a computer readable storage medium having program instructions embodied therewith. The program instructions are executable by a processor to cause the processor to perform actions of receiving a set of element-value pairs generated by running the application with a test case; identifying differences between the set of element-value pairs and a baseline data result for the test case; and displaying tree maps associated with respective elements in the set of element-value pairs. Each of the tree maps representing relationship of code entities of the application related to its associated element, wherein one or more of the tree maps are marked out to show the differences thereby localizing potential defective codes of the application that have caused the differences.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 8 shows another example structured data result and a baseline data result according to another embodiment of the present disclosure.

DETAILED DESCRIPTION

Figure 1:
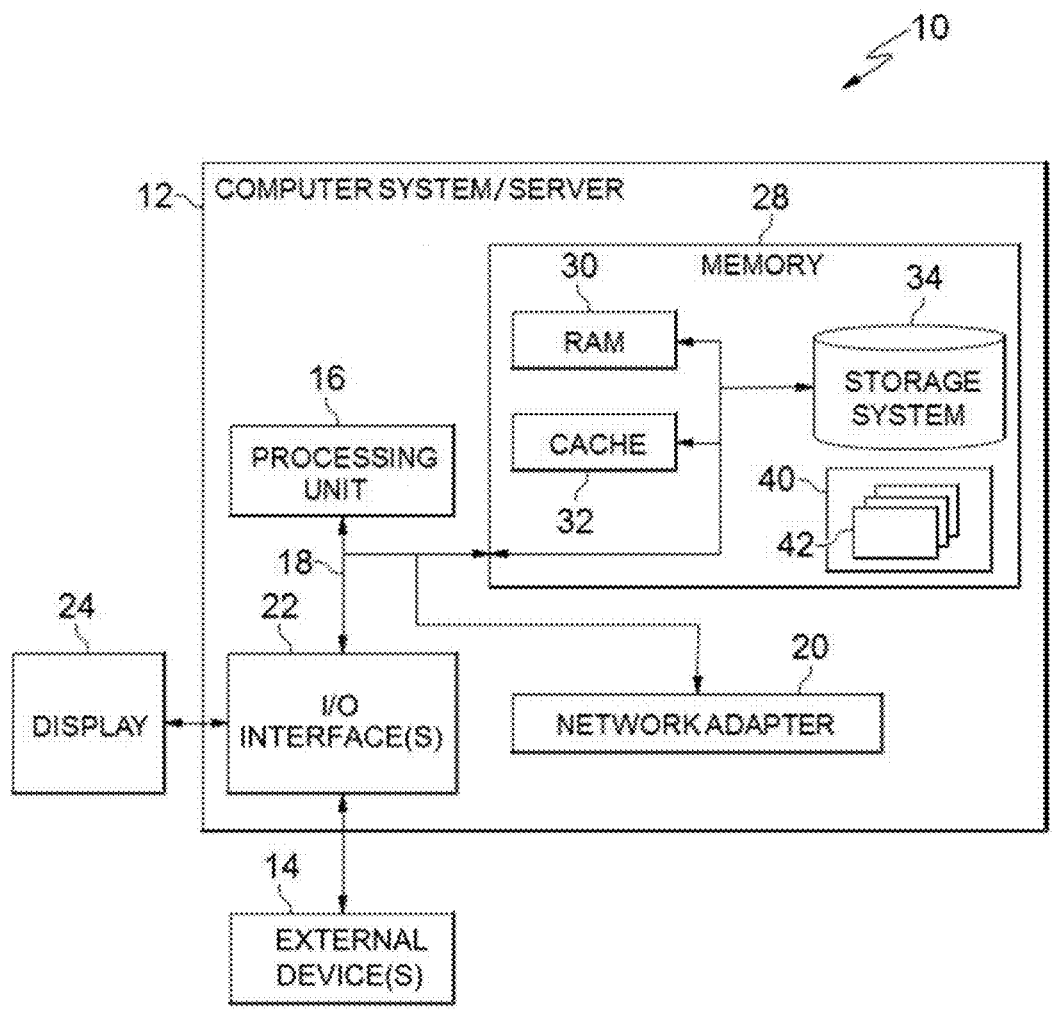
FIG. 1 depicts a cloud computing node according to some embodiments of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, at least one processor 16 (alternatively processing units), a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
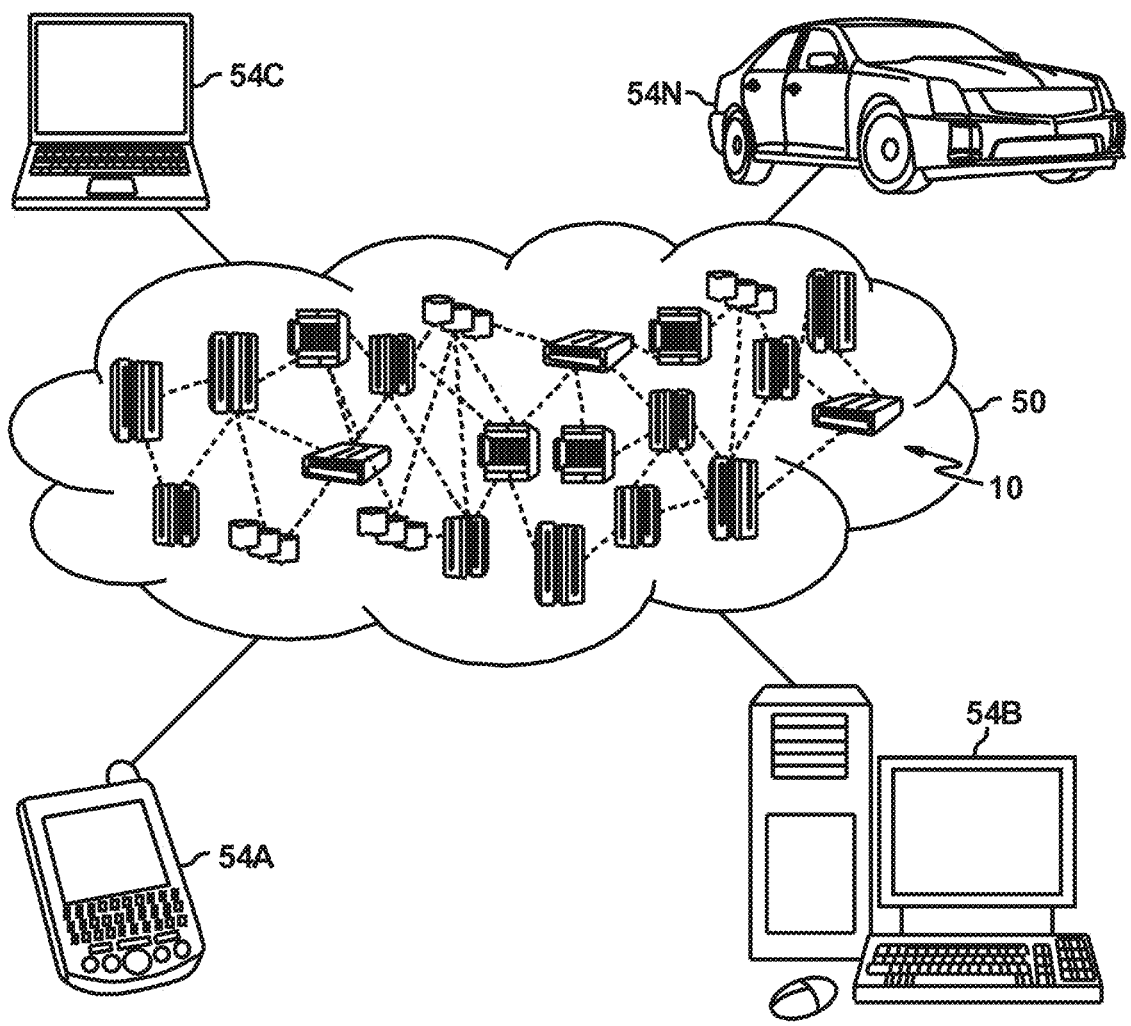
FIG. 2 depicts a cloud computing environment according to some embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
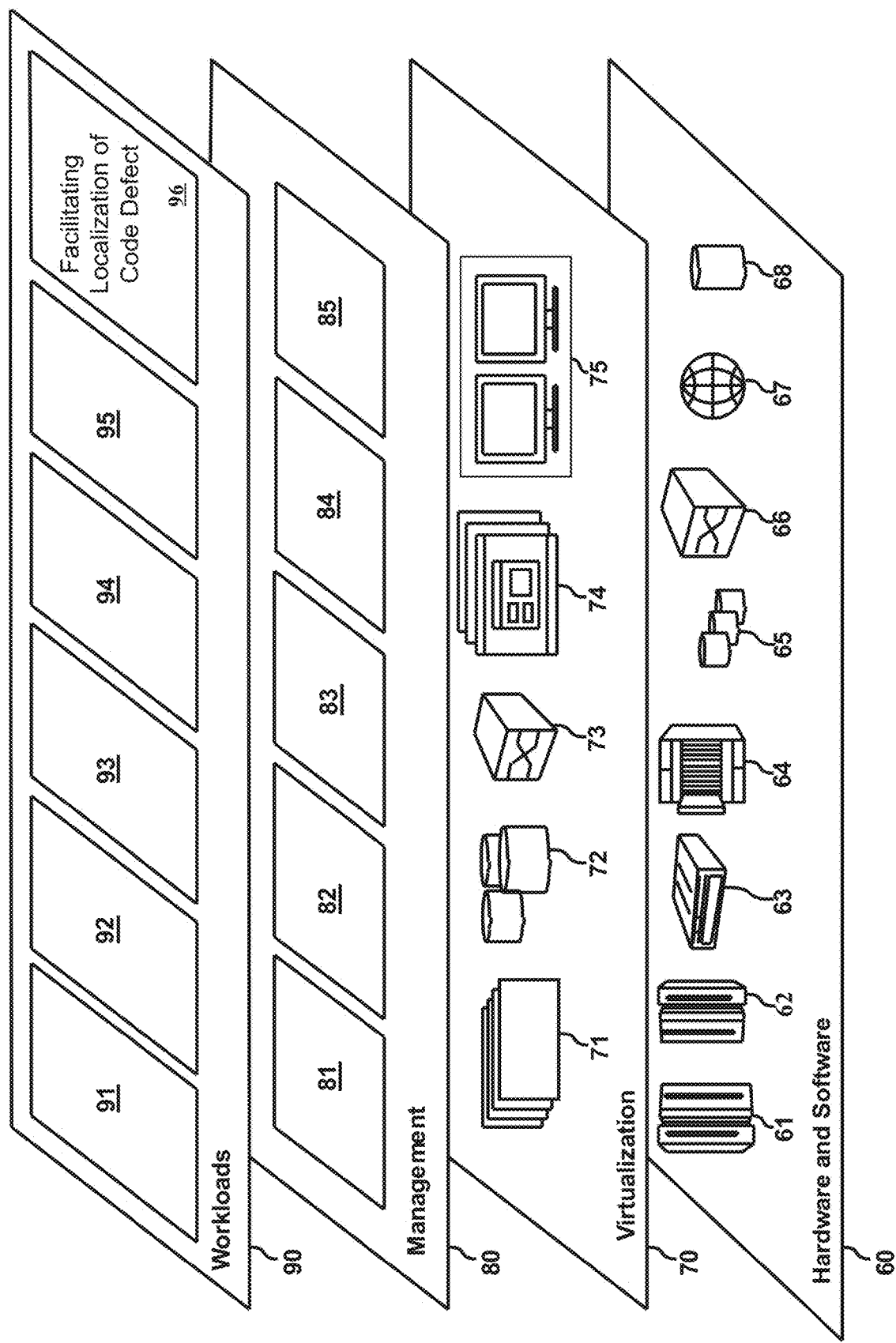
FIG. 3 depicts abstraction model layers according to some embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and facilitating localization of code defect 96.

With reference now to accompanying drawings, example embodiments of the present disclosure will be described. The example embodiments are directed to facilitating localization of code defect based on comparison of structured data result with baseline result.

As previously mentioned, testing is a cycle process of executing an application with different test cases and locating code defect to fix on the basis of results of the execution. One type of testing may include comparing a structured data result generated by an application with a baseline data result. If there are differences, an engineer may try to locate the position of defective code in the source code of the application based on the differences.

Structured data may refer to data that has a pre-defined model specifying how data is recorded, stored, processed and/or accessed. Structured data may be in a format in which information is encoded for storage and rendering. In business analysis, structured data format, such as XML, JSON and the like, may be commonly used to keep final/intermediate results of an application for data exchange and further consuming. In the context of the present disclosure, structured data result may be in a form of a structured data file generated by an application, which follows the definition of structured data format. In a structured data format, elements are building blocks which may behave as containers to hold values of numerical type, text type and so on. In other words, in a structured data format, structured data may be presented as element-value pairs, each pair consisting of an element and its corresponding value.

Figure 4:
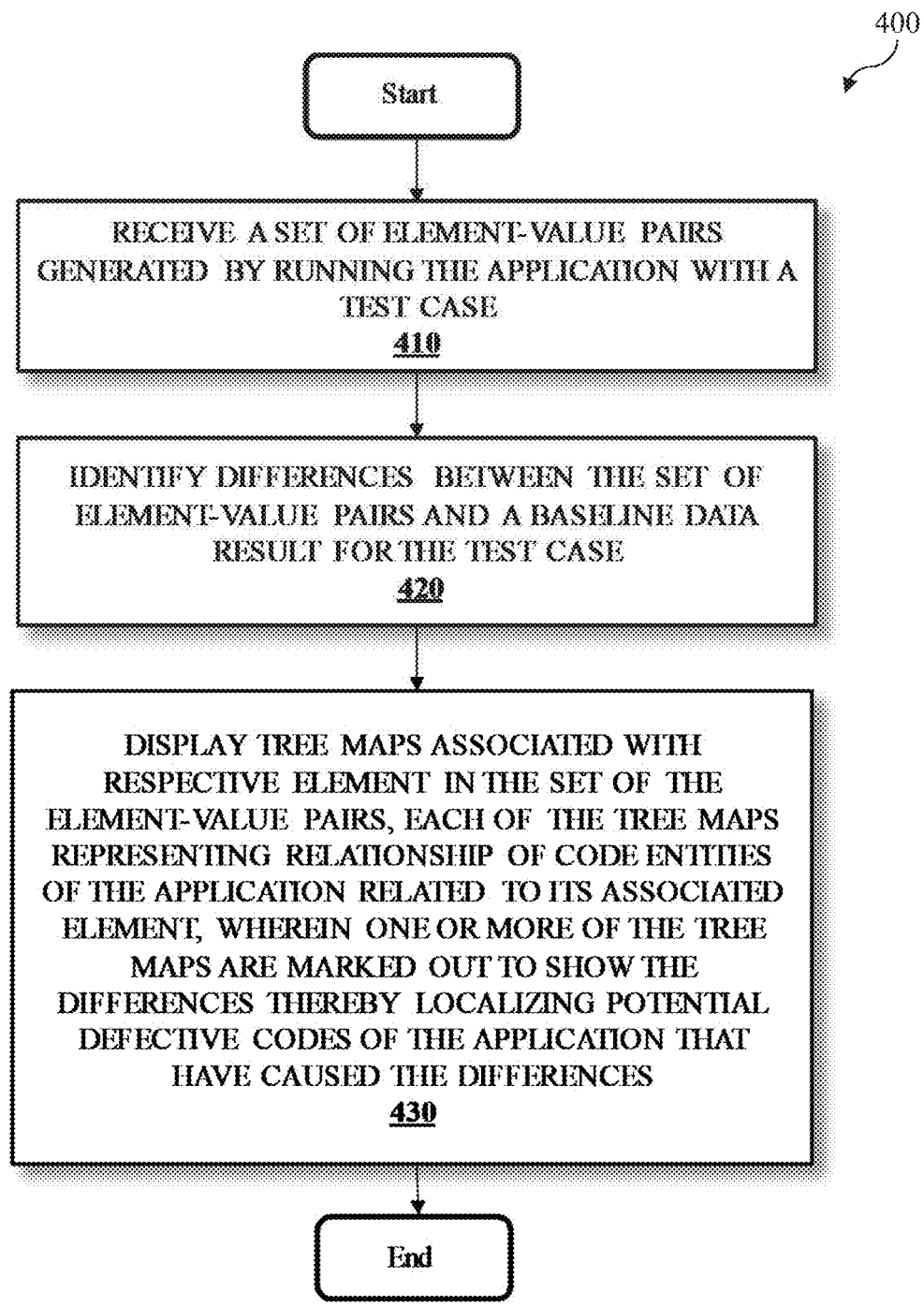
FIG. 4 depicts a flowchart of a method according to some embodiments of the present disclosure.

Refer to FIG. 4, which shows a flowchart of a computer-implemented method 400 for facilitating localization of code defect based on comparison of a structured data result with a baseline result according to some embodiments of the present disclosure. Generally speaking, method 400 comprises operations 410 to 430 that may be executed by one or more processors. To have an overview of the method 400, its operations are listed below.

(410) receiving a set of element-value pairs generated by running the application with a test case;
(420) identifying differences between the set of element-value pairs and a baseline data result for the test case;
(430) displaying tree maps associated with respective elements in the set of element-value pairs, each of the tree maps representing relationship of code entities of the application related to its associated element, wherein one or more of the tree maps are marked out to show the differences thereby localizing potential defective codes of the application that have caused the differences.

Before describing the operations in details, it may be helpful to introduce some concepts in the context of the present disclosure. Below is an example source code of a simple application called sample.java.

Sample.java
```
1 /**
2  * This is an example code to generate a structured data result as xml format.
3  * <p>
4  * <?xml version="1.0" ?>
5  * <XML version="1.0">
6  * <Statistic name="Element_1" value="2.3"/>
7  * <Statistic name="Element_2" value="274.9"/>
8  * </XML>
9  */
10 public class Sample {
11 // Joint variable: E_1
12 private double E_1=0.0;
13 // Joint variable: E_2
14 private double E_2=0.0;
15 // Constant value: Const_1
16 final double Const_1=3.1415926;
17 // Constant value: Const_2
18 final double Const_2=2.0;
19 // Intermediate variable: V_1
20 public double V_1=0.0;
21 // Intermediate variable: V_2
22 public double V_2=0.0;
23 // Intermediate variable: V_3
24 public double V_3=0.0;
25 // Intermediate variable: V_4
26 public double V_4=2*8-9;
27 // Computation action: computeC1
28 public double computeC1(double a, double b) {
29 return a-b;
30 }
31 // Computation action: computeC2
32 public double computeC2(double a, double b) {
33 return a+b;
34 }
35 // Computation action: computeC3
36 public double computeC3(double a) {
37 return 2* a;
38 }
39 // Computation action: computeC4
40 public double computeC4(double a, double b) {
41 return a*b;
42 }
43 // E2 is from other code file
44 public void setE2(double e_2) {
45 E_2=e_2;
46 }
47 // Export Element_1, Element_2 into XML file.
48 public void export( ) {
49 V_1=computeC3(Const_1);
50 V_2=computeC4(V_3, V_4);
51   E_1=computeC1(E_2, V_1)+computeC2(V_2, Const_2);
52 // Write the Element_1 to xml file
53 // <Statistic name="Element_1" value="2.3"/>
54 xml.export("Element_1", E_1);
55 // Write the Element_2 to xml file
56 // <Statistic name="Element_2" value="274.9"/>
57 xml.export("Element_2", E_2);
58 }
59 }
```

In the context of the present disclosure, there may be three types of code entities in the source code of the application: joint variable, intermediate variable and computation function.

A joint variable refers to a variable that may be used to write the value of an element into the structured data result of the application. In the sample source code, E_1 and E_2 are two joint variables, as shown in line 54 and line 57 in the sample.java.

An intermediate variable refers to a variable that may be used to compute a joint variable or another intermediate variable. In the sample source code, V1 and V2 are two intermediate variables.

A computation function refers to a computation operation that may use joint variables, intermediate variables, and/or constant values as input parameters. In the sample source code, computeC1, computeC2, computeC3 and computeC4 are four computation functions.

Suppose the example code, sample.java, is tested by executing it with a test case. The execution of the code generates a structured data result, such as shown in FIG. 5.

Figures 5, 6:
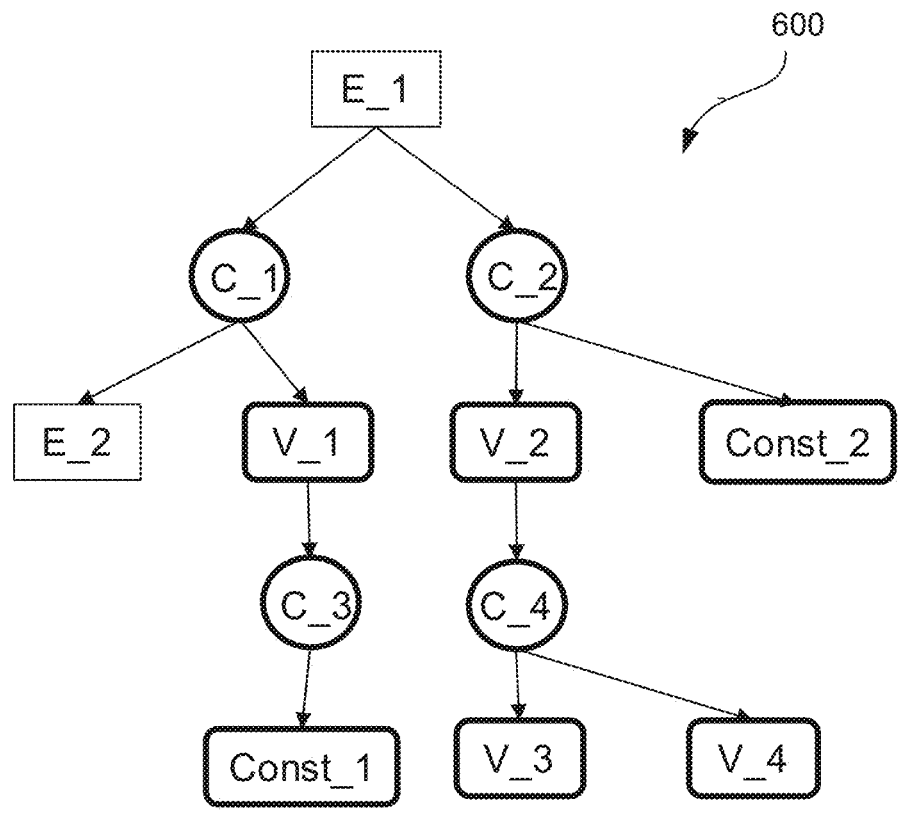
FIG. 5 depicts an example structured data result according to some embodiments of the present disclosure.
FIG. 6 shows an example tree map according to some embodiments of the present disclosure.

FIG. 5 shows a structured data result 500 generated by running the example code sample.java with a test case. Specifically, the structured data result 500 may be an XML file comprising two items:
  <Statistic name="Element_1" value="2.3"/>
  <Statistic name="Element_2" value="274.9"/>

In the context of the present disclosure, a statistic in the two items is referred to as element. Therefore, the two items may be represented by two element-value pairs, <Element_1, 2.3> and <Element_2, 274.9>. The first pair may include an element, Element_1, and a corresponding value, "2.3". The element Element_1 and the value 2.3 may be related to a joint variable E1, as may be derived from the source code. Similarly, the second pair may include an element, Element_2, and a corresponding value, "274.9". The element Element_2 and the value 274.9 may be related to another joint variable E2.

Turning back to FIG. 4, method 400 may start at operation 410, which includes receiving a set of element-value pairs. The element-value pairs may be generated by running the application with a test case. For ease of description, assume the set of element-value pairs received at operation 410 is the structured data result 500 shown in FIG. 5. That is, the element-value pairs may include <Element_1, 2.3> and <Element_2, 274.9>.

Following operation 410, operation 420 includes identifying differences between the set of element-value pairs and a baseline data result for the test case. This may be implemented by comparing the set of element-value pairs with a baseline data result for the test case. In the context of the present disclosure, the comparison may determine if the element-value pairs are consistent with the baseline data result. If all of the element-value pairs are consistent, the process of method 400 is ended. That means there is no problem with the test case.

For purpose of further description of complete process of method 400, assume there are element-value pairs that are not consistent with the baseline data result. For example, element-value pair <Element_1, 2.3> is not consistent. In other words, differences between the set of element-value pairs and a baseline data result for the test case may be identified at operation 420. This means there might be some code defect in the source code of sample.java.

Then, operation 430 is performed, which may include displaying tree maps associated with respective elements in the set of element-value pairs. Each of the tree maps may represent relationship of code entities of the application related to its associated element. One or more of the tree maps may be marked out to show the differences thereby localizing potential defective codes of the application that have caused the differences.

According to some embodiments of the present disclosure, a tree map may be built for each element in the set of element-value pairs.

Referring to FIG. 6, an example tree map 600 is shown according to some embodiments of the present disclosure. Specifically, the tree map 600 may represent a relationship of code entities of the application sample.java related to Element_1 of the element-value pair <Element_1, 2.3>.

As shown, there are four types of nodes in the tree map 600, namely "E" node, "C" node, "V" node, and "Const" node. An "E" type node may represent a joint variable. Here, node E_1 may represent the joint variable E_1 used to write the value 2.3 of the element Element_1 into the structured data result 500, and node E_2 may represent the joint variable E_2 used to write the value 274.9 of the element Element_2 into the structured data result 500. Hereinafter, the designation of an "E" type node will be used to refer to either the node itself or the joint variable represented by the node, where it is distinguishable in the context. For example, the designation "E1" may refer to either the node E_1 in the tree map or the joint variable E_1 in the source code.

A "C" type node may represent a computation function. Here, nodes C_1, C_2, C_3 and C_4 respectively may represent computation functions computeC1, computeC2, computeC3 and computeC4. Hereinafter, the designation of a "C" type node will be used to refer to either the node itself or the computation function represented by the node, where it is distinguishable in the context. For example, the designation "C_1" may refer to either the node C_1 in the tree map or the computation function C_1 in the source code.

A "V" type node may represent an intermediate variable. Here, nodes V_1, V_2, V_3 and V_4 respectively represent intermediate variables V_1, V_2, V_3 and V_4. A "Const" type node represents a constant value, which may be regarded as a special kind of intermediate variable. Here, nodes Const_1 and Const_2 respectively may represent constant values Const_1 and Const_2. Hereinafter, the designation of a "V" type node will be used to refer to either the node itself or the intermediate variable represented by the node, where it is distinguishable in the context. For example, the designation "V_1" may refer to either the node V_1 in the tree map or the intermediate variables V_1 in the code.

Since constant value is regarded as a special kind of intermediate variable, the different nodes may represent three types of code entities, namely joint variable, computation function, and intermediate variable. The relationship of the three entities is: joint variable used to export element-value pair; computation function used to compute joint variable; and intermediate variable as input of computation function. Therefore, the tree map also represent the relationship between the element Element_1 and the three types of code entities.

According to some embodiments of the present disclosure, a tree map for a given element (for example, Element_1) may be built as follows:

Operation S1. Search the code for the joint variable to export the element into structured data result and make the joint variable as the root node. In the instant case, it may be identified that the code in line 54 of sample.java, namely xml.export("Element_1", E_1), is to export Element_1 into the structured data result 500. The joint variable is E_1. Therefore, E_1 is made as the root node of the tree map 600.

Operation S2. Search the code for all computation functions by which the joint variable is computed, and make each of the found computation functions a child node of the node for the joint variable. In the instant case, E_1 is computed by two computation functions as shown in line 51 of sample.java, namely computeC1 and computeC2. Therefore, two child nodes, C_1 and C_2 representing computeC1 and computeC2 respectively, of the root node E_1 may be added to the tree map 600.

Operation S3. Search the code for all intermediate variables used as input variables of a computation function and make the intermediate variables as child nodes of the node for the computation function. In the instant case, the function C_1 has two inputs, E_2 and V_1. And function C_2 also has two inputs, V_2 and Const_2 which is a constant value. So, E_2 and V_1 are child nodes of Cl, while V_2 and Const_2 are child nodes of C_2.

Operation S5. For each "V" type node, repeat the operations of S2 and S3 until any of the following conditions are met: (1) an input variable of a computation function is a constant value; (2) an input variable of a computation function is a joint variable; or (3) the tree map cannot grow due to situations such as iteration. In the instant case, the intermediate variable V_1 is computed by function C_3 with input variable Const_1 (which is a constant value), as shown in line 49 of sampel.java. So, C_3 is child node of V_1, while Const_1 is child node of C_3. The intermediate variable V_2 is computed by function C_4 with two input variables V_3 and V_4, as shown in line 50 of sampel.java. So, C_4 is child node of V_2, while V_3 and V_4 are child nodes of C_4. Notably, E_2 serves as an input of C_1. Because E_2 is a joint variable, E_2 is made as a leaf node in the tree map 600.

One skilled in the art shall appreciate that the example tree map 600 represents hierarchical relationship of code entities related to the element Element_1. Specifically, the tree map 600 represents relationship of code entities E_1, E_2, C_1, C_2, C_3, C_4, V_1, V_2, V_3, V_4, Const_1 and Const_2. The code entities are related to the element Element_1. It is to be noted that the tree map 600 is just a representative of graphic representation of code entities. Alternative representations may also be contemplated, as shall be appreciated by those skilled in the art. Therefore, the principle and process of building such a tree map are intended to be illustrative rather than limiting the implementation of embodiments of the present disclosure.

According to some embodiments of the present disclosure, a tree map may be built for each of all elements. In the instant case, there are two elements, Element_1 and Element_2. Therefore, another tree map may be built for Element_2 as well as for Element_1 as described in the above.

According to some embodiments of the present disclosure, tree maps for respective elements in the set of element-value pairs may be aggregated into a forest map. With reference to FIG. 6 for example, the tree map 600 is associated with element Element_1, in which E_2 is a leaf node. E_2 may correspond to another element Element_2, for which another tree map might be built (not shown) The other tree map may include E_2 as a root node. Therefore, the tree map for Element_2 and the tree map 600 may be aggregated by merging the root node E_2 of the tree map for Element_2 with the leaf node E_2 in tree map 600.

Figure 7A:
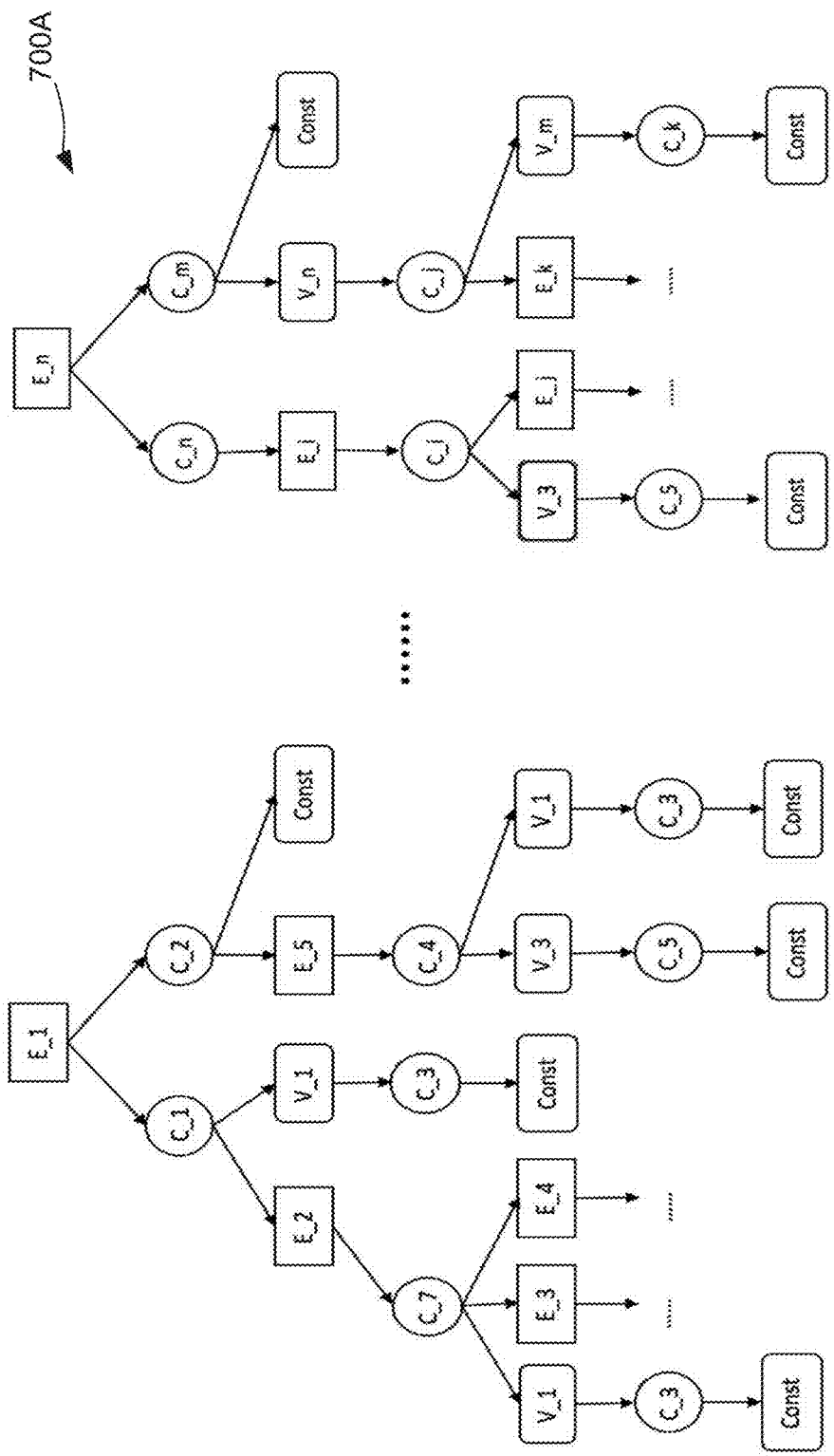
FIG. 7A depicts example tree maps according to another embodiment of the present disclosure.

Turning to FIG. 7A, which illustratively shows a forest map 700A according to another embodiment of the present disclosure. As shown, the forest map 700A results from merging n (n>1) tree maps with root nodes E_1, E_2, ..., E_n, in the similar way as for merging the tree map for Element_2 with tree map for Element_1 as described in the above in connection with FIG. 6.

The forest map 700A may correspond to an application to export n element-value pairs, which is more complex than the example application sample.java described in the above. The forest map 700A may show the relationship among the n elements, in addition to the relationship between individual elements and code entities that is already reflected in corresponding tree maps.

The timing of building the tree maps, such as tree map 600, for respective elements is a matter of choice. Specifically, the tree maps may be built after receiving element-value pairs at operation 410. However, the tree maps may also be built in advance of testing, as long as the code of the application is completed. It is also the same case with the forest map 700A.

FIG. 8, shows another example structured data result and a baseline data result according to another embodiment of the present disclosure. FIG. 8 may depict a structured data result 810 on the left side, and a baseline data result 820 on the right side. For purpose of description, assume the structured data result 810 is generated by the application corresponding to the forest map 700A, and the baseline data result 820 is for a test case with which the application is executed.

Back to FIG. 4, to illustrate the effect of the present disclosure, it may be assumed that the structured data result 810 is received at operation 410 rather than the structure data result 500. The structured data result 810 comprises n element-value pairs, each consisting of an element and its corresponding value. For example, item 811 may consist of element Element_1 and its corresponding value 31345.94, which may be denoted as <Element_1, 31345.94>. There are n elements, Element_1, Element_2, ... Element_n. The n elements may correspond to node E_1, E_2, ... E_n respectively.

At operation 420, differences between the set of element-value pairs and a baseline data result 820 are identified. This may be implemented by comparing the n element-value pairs compared with the baseline data result 820. The comparison result is illustrated in FIG. 8, where shaded lines indicate differences between the element-value pairs and the baseline data result 820. For example, the value "31345.94" of Element_1 of item 811 is not equal to "26598.25" of item 821. There are six element-value pairs not consistent with the baseline data result 820. The elements of the six element-value pairs are Element_1, Element_2, Element_4, Element_i, Element_j and Element_n.

Figure 7B:
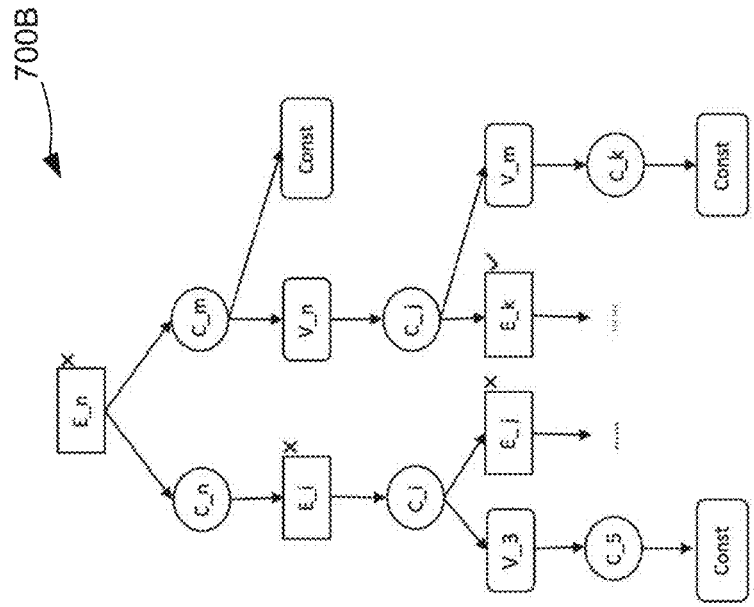
FIGS. 7B and 7C depicts the tree maps of FIG. 7A which are marked out for use in facilitating the locating of code defect according to some embodiments of the present disclosure.
Figure 7B:
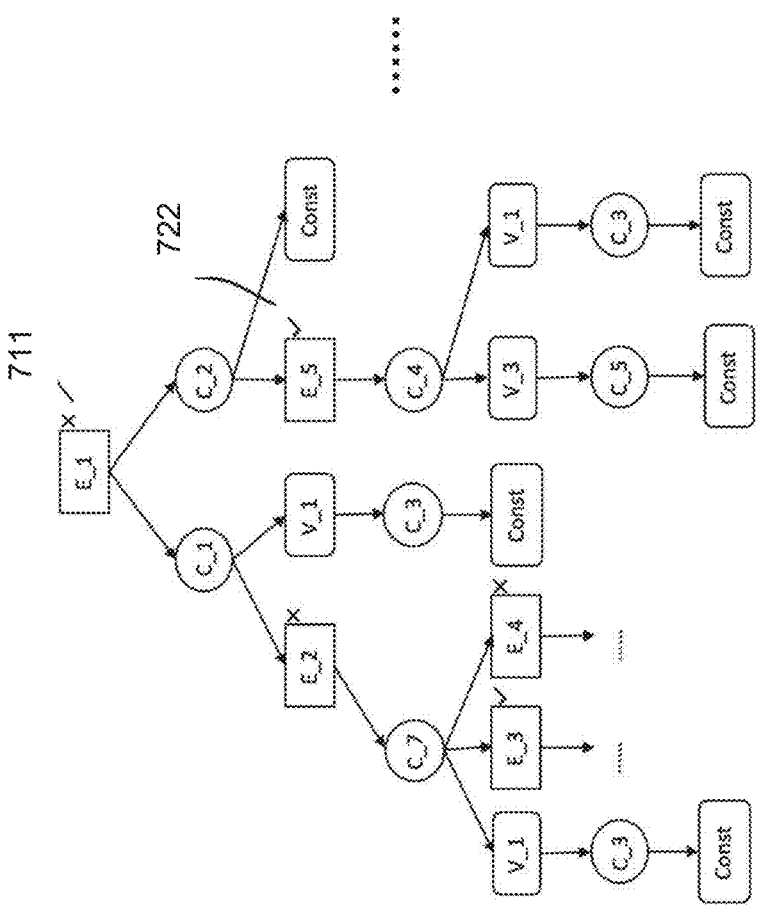

With reference to FIG. 7B, at operation 430, tree maps of forest map 700B associated with respective elements, Element_1, Element_2, ... Element_n, in the set of element-value pairs are displayed. Each of the tree maps map represent a relationship of code entities of the application related to its associated element. Compared to FIG. 7A, some of the maps in FIG. 7A are marked out.

According to some embodiments of the present disclosure, a tree map may be marked out by marking out its corresponding root node. For example, in FIG. 7B, six nodes E_1, E_2, E_4, E_i, Ej and E_n are notably marked with a symbol indicating inconsistency "x" 711, thereby the tree maps corresponding to the six root nodes are marked out. This means that the element-value pairs in the structured data result 810 corresponding to the six elements, Element_1, Element_2, Element_4, Element_i, Element_j and Element_n, are not consistent with the baseline data result 820, while the remaining element-value pairs are consistent with the baseline data result. Alternatively or additionally, nodes E_3, E_5, E_k may be marked with a symbol indicating consistency "b" 722, meaning that the element-value pairs corresponding elements, Element_3, Element_5 and Element_k, are consistent with the baseline data result 820.

The tree maps may be marked out in different ways. And in case of marking out their root nodes, the root node may be marked out in different ways. For example, they may be colored, shaded or highlighted in similar ways.

Now that the tree maps of the forest map 700 B are notably marked out to show the differences between the set of element-value pairs of structured data result 810 and a baseline data result 820, an engineer may take advantage of the marked-out tree maps of the forest map 700B to localize defective code in the source code (not shown) of the application that might have caused the differences.

For example, the tree map starting from its root node E_5 comprises two branches V1-C_3-Const and V3-C_5-Const under branch E_5-C_4. This means that E_5 is computed by function C_4 with intermediate variables V_1 and V_3. Since node E_5 is marked out with a consistent symbol "√" 722, it may be concluded that both the branch V1-C_3-Const and the branch V3-C_5-Const are correct. That means the code along the two branches is correct.

The tree map starting from E_2 map contains a branch C_7-V1-C_3-Const, a branch C_7-E_3 and a branch C_7-E_4. The branch C_7-V1-C_3-Const may share the branch V1-C_3-Const under the branch E_5-C_4. Because it has been determined that the code along the branch V1-C_3-

Const is correct, there is no need to check the code along the branch V1-C_3-Const under C_7.

For the same reason, there is no need to check the code along the branch V1-C_3-Const under C_1.

Similarly, there is no need to check the code along the branch V3-C_5-Const under C_i, because the branch V3-C5-Const has been determined to be correct from the analysis of the tree map starting from E_5.

Figure 7C:
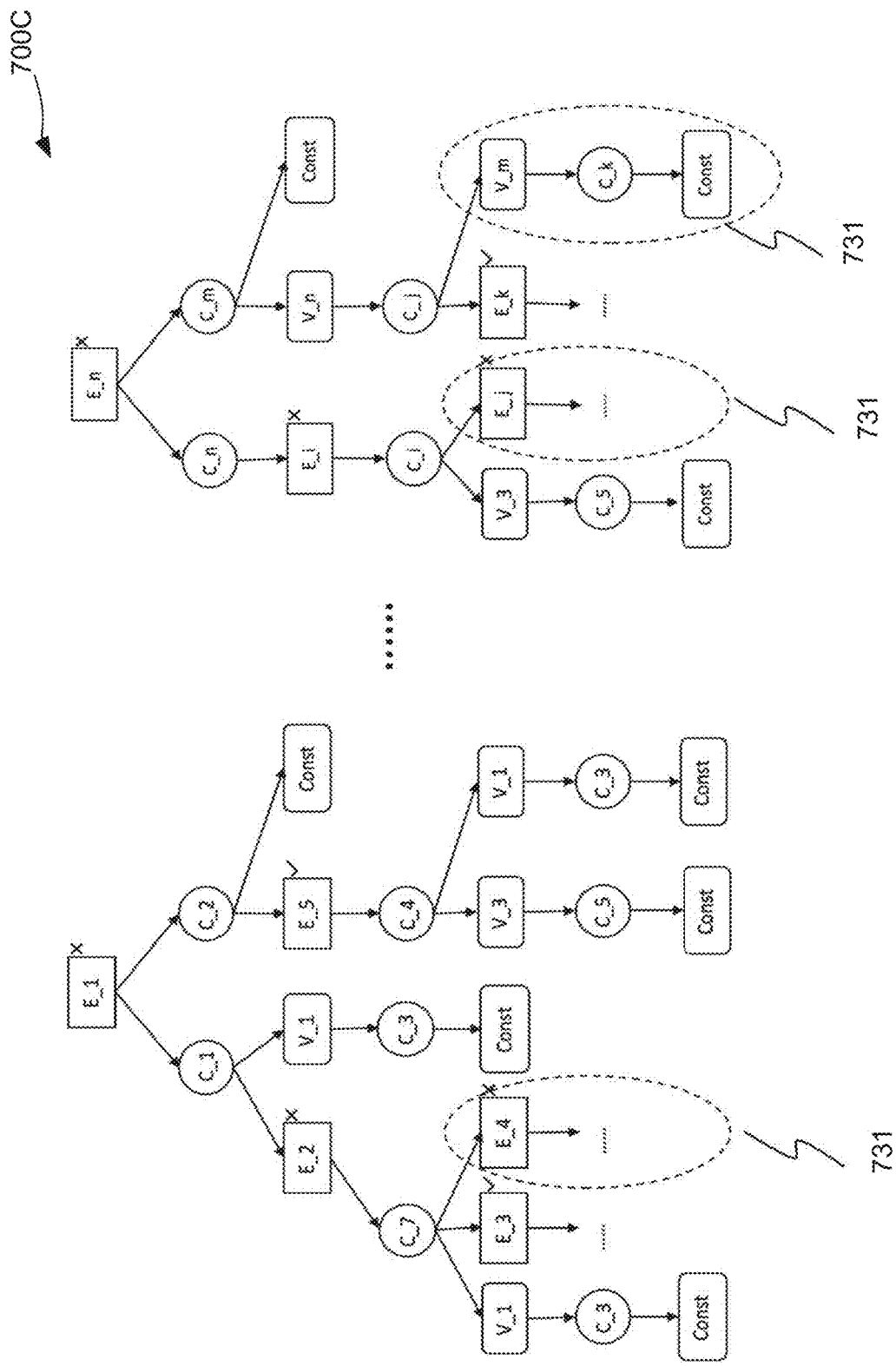

Turning to FIG. 7C, since the branches of tree maps of forest map 700C are excluded from further checking, the search for potential defective codes may be focused on other branches. In the instant case, the position of potential defective codes may be localized to branches starting from node E_4, node Ej and node V_m, as indicated by ellipse line 731. This may significantly improve the efficiency of the engineer in searching for code defect in the source code.

The processing of facilitating the localization of code defect of an application according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for facilitating localization of code defect of an application, comprising:
    receiving, by one or more processors, a set of element-value pairs generated by running the application with a test case;
    identifying, by the one or more processors, differences between the set of element-value pairs and a baseline data result for the test case; and
    displaying, by one or more processors on a display device, tree maps associated with respective elements in the set of element-value pairs, each of the tree maps representing relationship of code entities of the application related to its associated element, wherein one or more of the tree maps are marked out to show the differences and to highlight potential defective codes of the application that have caused the differences.

2. The method of claim 1, wherein the code entities comprise one or more of the following types:
    a joint variable used to export element-value pair;
    a computation function used to compute joint variable; and
    an intermediate variable as input of the computation function.

3. The method of claim 1, further comprising:
    building, by one or more processors, the tree maps respectively for all elements in the set of element-value pairs, wherein each of the tree maps has a root node to represent a joint variable used to export one of the set of element-value pairs.

4. The method of claim 1, wherein the one or more of the tree maps are marked out by marking out their corresponding root nodes.

5. The method of claim 4, wherein the one or more of the tree maps are marked out responsive to their associated element-value pairs not being consistent with the baseline data result.

6. The method according to claim 4, wherein the one or more of the tree maps are marked out responsive to their associated element-value pairs being consistent with the baseline data result.

7. The method according to claim 4, wherein the tree maps include a forest map in which one of the tree maps is a subtree of another tree map according to their dependency relationship.

8. A system for facilitating localization of code defect of an application, comprising:
    one or more processors; and
    a computer-readable memory coupled to the one or more processors, the computer-readable memory comprising instructions for:
        receiving a set of element-value pairs generated by running the application with a test case;
        identifying differences between the set of element-value pairs and a baseline data result for the test case; and
        displaying tree maps associated with respective elements in the set of element-value pairs, each of the tree maps representing relationship of code entities of the application related to its associated element, wherein one or more of the tree maps are marked out to show the differences thereby localizing potential defective codes of the application that have caused the differences.

9. The system of claim 8, wherein the code entities comprise one or more of the following types:
    joint variable used to export element-value pair;
    computation function used to compute joint variable; and
    intermediate variable as input of computation function.

10. The system of claim 8, wherein the instructions further comprise:
    building the tree maps respectively for all elements in the set of element-value pairs, wherein each of the tree maps has a root node to represent a joint variable used to export one of the set of element-value pairs.

11. The system of claim 10, wherein the one or more of the tree maps are marked out by marking out their corresponding root nodes.

12. The system of claim 11, wherein the one or more of the tree maps are marked out responsive to their associated element-value pairs being not consistent with the baseline data result.

13. The system of claim 11, wherein the one or more of the tree maps are marked out responsive to their associated element-value pairs being consistent with the baseline data result.

14. The system of claim 11, wherein the tree maps constitute a forest map in which one of the tree maps is a subtree of another according to their dependency relationship.

15. A computer program product for facilitating localization of code defect of an application, comprising a computer readable storage medium having program instructions embodied therewith, the program instructions executable by a processor to cause the processor to perform actions of:
    receiving a set of element-value pairs generated by running the application with a test case;
    identifying differences between the set of element-value pairs and a baseline data result for the test case; and
    displaying tree maps associated with respective elements in the set of element-value pairs, each of the tree maps representing relationship of code entities of the application related to its associated element, wherein one or more of the tree maps are marked out to show the differences thereby localizing potential defective codes of the application that have caused the differences.

16. The computer program product of claim 15, wherein the code entities comprise one or more of the following types:
   a joint variable used to export element-value pair;
   a computation function used to compute joint variable; and
   a intermediate variable as input of computation function.

17. The computer program product of claim 16, wherein the action further comprises:
   building the tree maps respectively for all elements in the set of element-value pairs, wherein each of the tree maps has a root node to represent a joint variable used to export one of the set of element-value pairs.

18. The computer program product of claim 16, wherein the one or more of the tree maps are marked out by marking out their corresponding root nodes.

19. The computer program product of claim 18, wherein the one or more of the tree maps are marked out responsive to their associated element-value pairs not being consistent with the baseline data result.

20. The computer program product of claim 18, wherein the tree maps constitute a forest map in which one of the tree maps is a subtree of another according to their dependency relationship.

* * * * *